Figure 1:
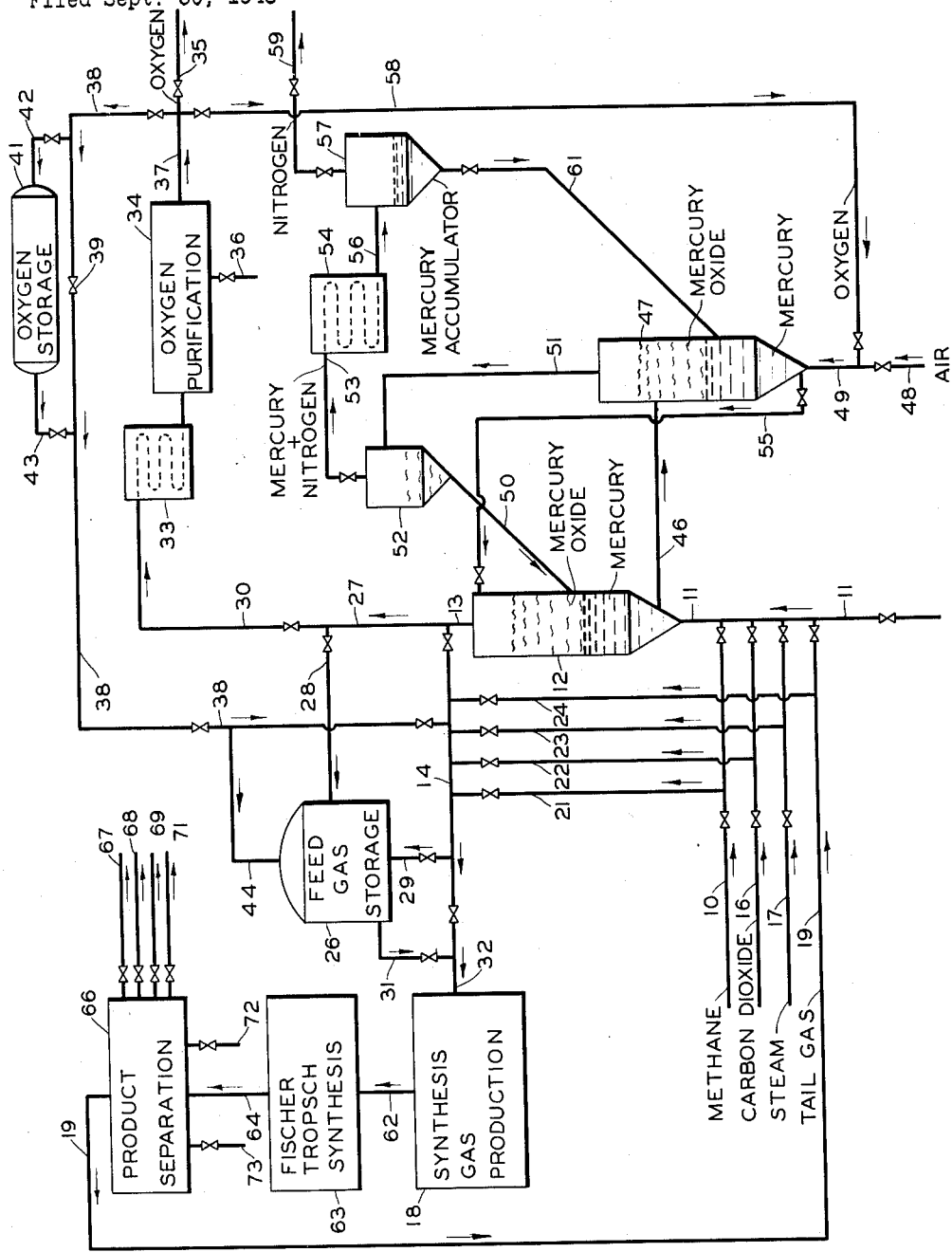

Sept. 27, 1955        S. G. STEWART        2,719,130

SYNTHESIS GAS MANUFACTURE

Filed Sept. 30, 1948        2 Sheets-Sheet 1

INVENTOR.
S.G. STEWART

BY *Hudson and Young*

ATTORNEYS

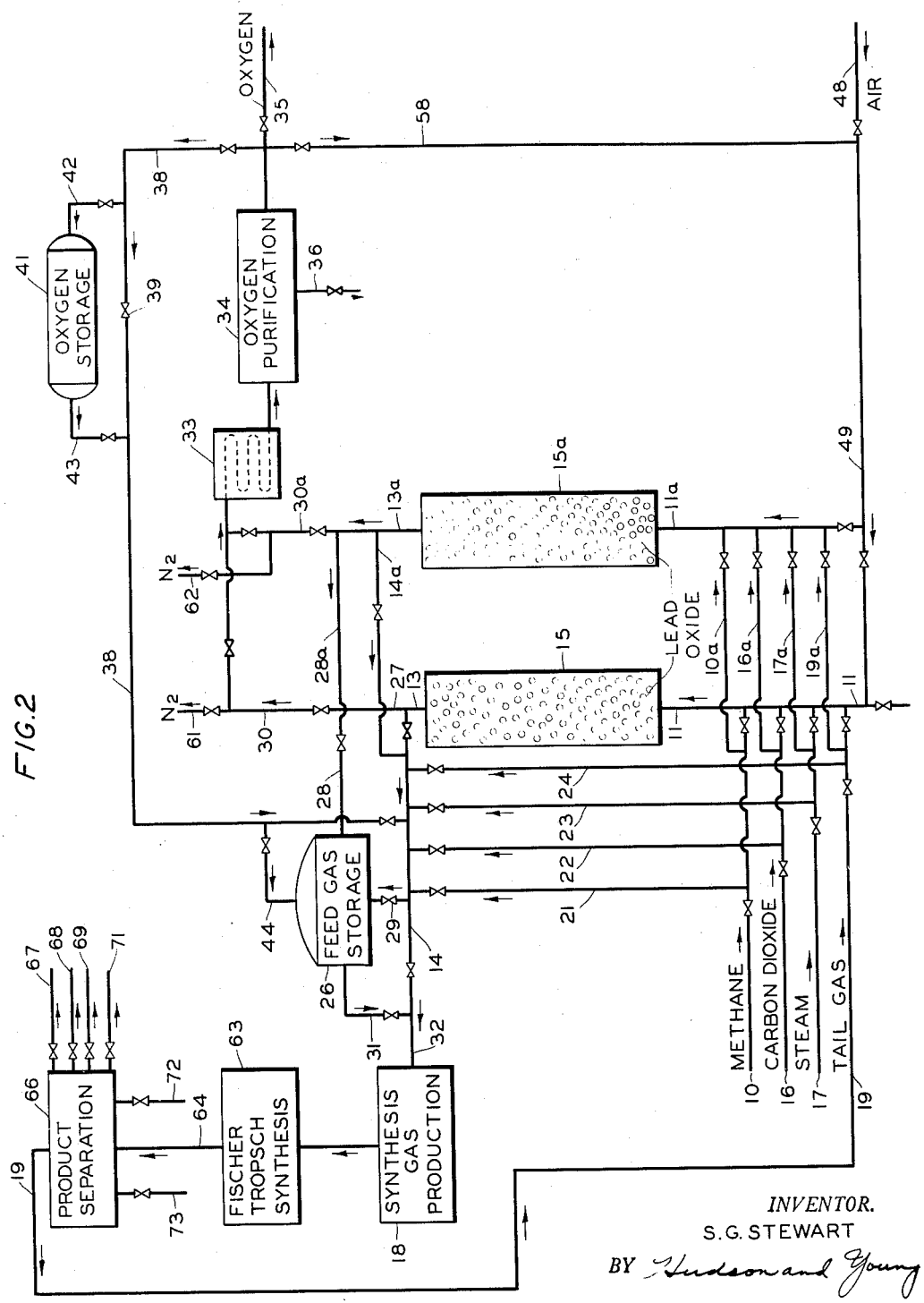

United States Patent Office 2,719,130
Patented Sept. 27, 1955

2,719,130

SYNTHESIS GAS MANUFACTURE

S. Grant Stewart, Bartlesville, Okla., assignor to Phillips Petroleum Company, a corporation of Delaware Application September 30, 1948, Serial No. 51,991

16 Claims. (Cl. 252—373)

This invention relates to synthesis of hydrocarbons and oxygen-containing materials from hydrogen and carbon monoxide. In one aspect this invention relates to the preparation of carbon monoxide-hydrogen feed gas for a synthesis step of a process of the Fischer-Tropsch type. In another aspect this invention relates to the preparation of a hydrocarbon-oxygen stock to be utilized in the production of carbon monoxide-hydrogen feed stocks.

In a process of the Fischer-Tropsch type, carbon monoxide is hydrogenated to produce hydrocarbons and oxygen derivatives of hydrocarbons. The process is generally considered to consist of two steps, the synthesis gas preparation step, and the synthesis step proper. In the first named step, carbon monoxide and hydrogen are produced by the partial oxidation of a carbon-containing material such as a hydrocarbon, coal, or coke, usually with an oxidizing agent such as steam, carbon dioxide, or oxygen, or with various combinations of such oxidizing agents. In the second named step the synthesis feed gas thus produced, is contacted with a selected catalyst under predetermined conditions of temperature, pressure, space velocity and feed composition, whereby hydrogenation of the carbon monoxide occurs and various hydrocarbons and oxygen derivatives of hydrocarbons are formed, as product.

The economic success of the Fischer-Tropsch type process depends to a large extent upon the economics of the synthesis gas preparation step, i. e., the cost of the synthesis gas. Numerous processes employing various oxidizing agents have been proposed for the preparation of synthesis gas. Such methods involve the high temperature oxidation of the raw carbon-containing material with oxidizing agents such as those already discussed. The oxidation of a hydrocarbon, for example, is represented by the following net equations where methane, representing the hydrocarbon, is oxidized by each of the oxidizing agents, oxygen, steam and carbon dioxide.

1. $2CH_4 + O_2 = 2CO + 4H_2 + 30,800$ B. t. u.
2. $CH_4 + H_2O = CO + 3H_2 - 88,700$ B. t. u.
3. $CH_4 + CO_2 = 2CO + 2H_2 - 106,400$ B. t. u.

Regardless of which oxidizing agent is used, the resulting product is a mixture of steam, carbon monoxide, carbon dioxide, and hydrogen, together with any unreacted hydrocarbon.

Two methods for producing synthesis gas have been proposed; they are steam-carbon dioxide reforming, and partial oxidation with free oxygen. In each instance, hydrogen and carbon monoxide may be produced in any desired mole ratio to each other between about 3:1 and 1:1. The steam-carbon dioxide reforming method involves the utilization of steam and carbon dioxide as the only oxidizing agents, and has the advantage that it does not require expensive feed components. However, the reactions are highly endothermic, and expensive equipment must necessarily be employed to transfer heat to the reaction zone at the high temperatures required. The partial oxidation process has the advantage that the reaction is exothermic and requires equipment less expensive than that of the reforming process, but it has the disadvantage of requiring expensive process oxygen.

The partial oxidation process generally comprises passing preheated oxygen and a hydrocarbon gas into a refractory lined partial oxidation or combustion chamber wherein the mixture is burned to form synthesis gas. Reaction temperatures are maintained preferably in excess of 2350° F. to obtain essentially complete hydrocarbon conversion to the equilibrium product mixture, and are controlled by the mole ratio of oxygen to hydrocarbon in the hydrocarbon-oxygen feed gas. In order to attain a temperature level in excess of 2350° F., and in order for the reaction to be autothermic when oxidizing natural gas for example, a mole stoichiometric ratio of oxygen to hydrocarbon, above 0.6:1 is usually required. Oxygen thus employed contributes to the formation of both carbon dioxide and water, with disproportionately high concentrations of water relative to carbon dioxide being produced; consequently the mole ratio of hydrogen to carbon monoxide in the synthesis gas product is usually below preferred values, which are in the range of about 1.7:1 to about 2.3:1. In order to adjust the mole ratio of hydrogen to carbon monoxide in the synthesis gas product, either steam or carbon dioxide, or both, may be added to the hydrocarbon-oxygen feed. The reaction of each, steam and carbon dioxide, with methane is illustrated hereinabove. Steam, so added and reacted, contributes to an increased mole ratio of hydrogen to carbon monoxide in the synthesis gas product, and carbon dioxide so added and reacted, contributes to a decreased mole ratio of hydrogen to carbon monoxide therein. These reactions are highly endothermic and the concentration in the influent hydrocarbon-oxygen mixture to the partial oxidization zone, of supplementary steam and/or carbon dioxide to be so reacted, is necessarily limited in order that the partial oxidation reaction be maintained autothermic. When there is no appreciable amount of available hydrocarbon for reaction with supplementary steam or carbon dioxide, steam or carbon dioxide thus added to the feed acts mainly as a diluent, although these components alter the composition of the equilibrium mixture by virtue of the water gas shift reaction, $H_2 + CO_2 \rightleftharpoons H_2O + CO$. In such a case, adding carbon dioxide produces carbon monoxide and steam at the expense of hydrogen, whereas adding steam produces hydrogen and carbon dioxide at the expense of carbon monoxide.

Proposed partial oxidation methods utilize oxygen manufactured by the low temperature fractionation of air. In such processes for the manufacture of oxygen, extensive and massive equipment, especially designed, is required, much of which is necessarily fabricated from special metal alloys. This type of equipment, its maintenance, and its operation, is expensive, and is the source of a disproportionately high cost of synthesis gas feed for a process of the Fischer-Tropsch type.

My invention is concerned with a process for the manufacture of synthesis gas by the partial oxidation of a hydrocarbon material, usually a normally gaseous hydrocarbon material, wherein oxygen therefor is produced by a novel inexpensive method, thus eliminating the need for expensive air fractionation equipment, and reducing the oxygen cost requirements to a small fraction of those proposed heretofore.

An object of my invention is to provide a process for the manufacture of hydrocarbons and oxygen derivatives of hydrocarbons.

Another object is to provide an improved process for the manufacture of carbon monoxide-hydrogen stocks.

Another object is to provide a method for producing hydrocarbon-oxygen feed stock for a partial oxidation process wherein a carbon monoxide-hydrogen product is formed, which is suitable for use as feed to a synthesis step of a Fischer-Tropsch type process.

Another object is to provide a novel method for utilizing various metallic oxides as a source of oxygen in a partial oxidation process for the manufacture of synthesis gas.

Other objects of my invention will be apparent, to one skilled in the art, from the accompanying discussion and disclosure.

In accordance with my invention, a hydrocarbon-oxygen stock is prepared by admixing a hydrocarbon gas with free oxygen liberated by a metallic oxide, and the resulting hydrocarbon-oxygen mixture passed either alone or together with supplemental oxidizing gas to a partial oxidation or combustion zone wherein it is converted to carbon monoxide-hydrogen product gas suitable for utilization, for example, as feed to a Fischer-Tropsch synthesis step wherein hydrocarbons and oxygen derivatives of hydrocarbons are produced. Although my invention may be often utilized in the production of carbon monoxide-hydrogen feed mixtures for processes of the Fischer-Tropsch type, it is to be understood that it may also be employed in the production of carbon monoxide-hydrogen mixtures suitable for utilization in other processes. For example, when employing my process, hydrocarbon-oxygen stock may be produced for conversion to a suitable carbon monoxide-hydrogen feed mixture for a methanol synthesis step, wherein the carbon monoxide and hydrogen react to form methanol, as a primary product. By my process, hydrocarbon-oxygen stocks may be prepared for conversion to suitable carbon monoxide-hydrogen feed mixtures for a process of the oxo type, i. e., wherein the carbon monoxide and hydrogen thus produced add to an olefin, usually of high molecular weight, to form alcohols and aldehydes as the chief product. In another application of my invention, hydrocarbon-oxygen stocks may be prepared for conversion to hydrogen carbon monoxide feed mixtures suitable for hydrogen manufacture. In such an application, the hydrogen-carbon-monoxide product may be contacted with steam in the presence of an iron catalyst at a temperature usually approximating from 1200 to 1500° F., whereby the water gas shift favors production of hydrogen and carbon dioxide, the latter being subsequently scrubbed from the shift product to produce hydrogen in high yield.

In the practice of my invention, I pass a carrier gas through a body of metallic oxide at a temperature at which free oxygen is liberated from the oxide, forming a mixture of carrier gas and oxygen. Such a carrier gas may be a hydrocarbon gas or a gas such as steam or carbon dioxide that may serve, as a reactant in a partial oxidation zone to form synthesis gas. Tail gas from a Fischer-Tropsch synthesis step may serve as a carrier gas, as will be described more fully hereinafter. The resulting carrier gas-oxygen mixture is modified, as desired, to facilitate utilization of its oxygen, and is admixed, if necessary, or desired, with supplementary reactants, and passed to the partial oxidation zone and therein converted to synthesis gas.

The oxide body can be utilized in fluid bed, fixed bed or moving bed type operation. Metallic oxides used herein are those which liberate oxygen at temperatures below those at which any substantial chemical change in the carrier gas occurs, when in contact with the oxide liberating oxygen, and which are regenerated by the action of an oxygen-containing gas, such as air. Among my preferred oxides are mercury oxides, lead oxides, and silver oxides. Other oxides that can be used in the practice of my invention include such as strontium oxide, $SrO_2$; tin oxide $SnO_2$; cobalt oxide, $Co_2O_3$, and barium peroxide, $BaO_2$.

I have stated that such oxides liberate oxygen at a temperature lower than those at which any substantial reaction occurs with the carrier gas when in contact with the oxide liberating oxygen. By use of the term "substantial" is meant to acknowledge that in some cases, depending upon the characteristics of the selected oxide, the temperature at which oxygen is liberated might be such that minor amounts of hydrocarbon carrier gas may be oxidized in the presence of such free oxygen under those oxygen liberating conditions. Such minor amounts are not greater than 30 volume per cent and often may be in the range of from 5 to 10 per cent, although more generally less than 5 per cent. Such minor oxidation of the hydrocarbon carrier taking place is below that suitable for the oxidation of hydrocarbon to produce synthesis gas, and if any such oxidation takes place at all, it in no way hinders the practice of my invention. In fact, the products of any such oxidation, comprising carbon dioxide and steam would conveniently serve as reactants in the subsequent partial oxidation step. Any minor amounts of carbon monoxide or hydrogen formed, when employing a hydrocarbon carrier, would pass on through the subsequent partial oxidation zone to be recovered in the synthesis gas product. It is only such a process utilizing a metallic oxide for the manufacture of synthesis gas in situ, that is outside the scope of my invention.

Various modifications of my invention are advantageously employed. For example, steam can be used as the sole carrier gas and be subsequently removed in whole or in any desired proportion, and the resulting pure oxygen or oxygen-rich component, as the case may be, admixed with hydrocarbon gas, and passed to a combustion zone for conversion to synthesis gas. Oxygen of high purity can be prepared in accordance with my process, and be stored for special utilization as a component of hydrocarbon-oxygen stocks for a partial oxidation process of the type herein described. Any carrier gas can be used in the place of steam to produce pure oxygen or oxygen-rich stocks, although a carrier gas is preferably employed therefor which is easily separable, such as steam, or carbon dioxide.

In the practice of my process, I may employ a hydrocarbon gas as a carrier and supplement the resulting hydrocarbon-oxygen mixture with steam, carbon dioxide or tail gas from a Fischer-Tropsch synthesis step, or any combination or any or all of these, and pass the supplemented hydrocarbon-oxygen mixture to the partial oxidation zone. Similarly, I may pass a minimum amount of hydrocarbon gas through the oxide body and admix the resulting hydrocarbon-oxygen effluent with supplemental hydrocarbon. I can utilize any one, all, or any combination of my known carriers and supplement the resulting carrier-oxygen mixture with hydrocarbon and an oxidizing gas above-named, if desired, and pass the supplemented mixture to the partial oxidization zone.

I maintain the desired state of oxidation of the selected oxide by regeneration with an oxygen-containing gas, such as air. This is done during fluid type or moving bed type operation, by utilizing a separate regeneration zone wherein partially spent oxide passed from the contacting zone, is reoxidized therein and recycled to the contacting zone. In fixed bed operation, a plurality of chambers is employed, and the oxygen liberating step and regeneration steps are operated in cycles of predetermined durations. Preferably, I employ a hydrocarbon gas as a carrier and supplement the resulting hydrocarbon-oxygen mixture with steam, carbon dioxide or tail gas from a Fischer-Tropsch synthesis step, each alone, or with a combination of any or all of them, or with additional hydrocarbon gas.

The hydrocarbon most generally employed in the practice of my invention is methane, or a normally gaseous hydrocarbon mixture such as natural gas, or natural gas stripped of its heavier components. However, it is to be understood that it is within the scope of my invention to use any hydrocarbon in a gaseous state that can be partially oxidized to carbon monoxide and hydrogen.

In order to illustrate my invention more fully, reference will be made to Figures I and II, attached. The figures are each diagrammatic illustrations of one form of apparatus in which my invention may be practiced. It is to be understood, therefore, that the flow diagrams as represented in the figures are each diagrammatic only and may be altered in many respects by those skilled in the art and yet remain within the intended scope of my invention.

In Figure I are illustrated several embodiments of my invention. I employ mercury oxide in my preferred embodiment because it liberates oxygen with ease, at advantageously low temperatures, and because when spent, it is easily reoxidized, or regenerated with air. Mercury has the additional advantage of being a liquid at ordinary temperatures and is, therefore, easily moved from the contacting zone to the regeneration zone. Furthermore, minimum space velocities of the influent carrier gas are not critical, because although this embodiment offers numerous advantages typical of those of fluid type operation, a fluid mercury oxide bed is not essential to the practice of this invention. In many cases, a fluid mercury oxide bed may be advantageously employed.

Referring then to Figure I, methane in line 10 is passed through line 11 to contacting zone 12 containing mercury oxide maintained at a temperature within the range of about 100° C. to about 800° C., preferably within the range of 100 to 250° C. Under such temperature conditions in zone 12, the mercury oxide liberates free oxygen. Methane, passed through zone 12 as a carrier gas, at a space velocity usually within the limits of 100–2500 standard gas volumes per volume of oxide per hour, removes the liberated free oxygen from zone 12 in admixture with itself. Effluent gas from zone 12 comprising a methane-oxygen mixture, is passed through line 13. When operating in this manner, it is preferable to provide for returning any mercury in line 13 to zone 12 or to zone 47 described hereafter. This may be done by incorporating a cooling and separating means in line 13 similar to that comprising cooler 54 and accumulator 57 described hereafter, and returning liquid mercury therefrom to zone 12 or to zone 47. Reduced or spent oxide, in zone 12, i. e., metallic mercury, drops by force of gravity to the bottom and is passed to a separate regeneration zone discussed hereafter, and the regenerated oxide is returned to contacting zone 12. The rate of oxygen liberation in zone 12 is regulated by maintaining the desired temperature level therein, and the concentration of oxygen in the effluent from zone 12 at a given temperature level is regulated by the methane carrier gas influent rate. By controlling these two variables, the oxygen content of effluent gas passing through line 13 is regulated. The mole ratio of oxygen to methane in a methane-oxygen mixture to be converted by combustion to form synthesis gas is usually at least about 0.6:1. When utilizing a heavier hydrocarbon, higher mole ratios are required. For example, when burning an oxygen-natural gas mixture, a mole ratio of oxygen to natural gas within the limits of 0.7:1 to 0.9:1 may usually be employed. Methane-oxygen in line 13 may be passed directly through lines 14 and 32 to partial oxidation zone 18 and therein converted to synthesis gas. The conditions employed requisite to the production of synthesis gas in zone 18 are those known in the art and discussed briefly hereinabove. Conversion in zone 18, of methane to synthesis gas is usually in the order of 80 to 90 per cent and even higher. The mole ratio of hydrogen to carbon monoxide in the synthesis gas product is preferably within the limits of 1.7:1 to 2.3:1, more often about 2:1; consequently it may be preferred to adjust the mole ratio by adding steam and/or carbon dioxide to the effluent in line 13; it may be advantageous to supplement effluent in line 13 with additional methane. This is done by admixing either steam, carbon dioxide or tail gas from a Fischer-Tropsch synthesis step, or methane, or a combination of all or any such gases, in line 14, with methane-oxygen from line 13. This may be done by passing to line 14, methane from lines 10 and 21, carbon dioxide from lines 16 and 22, steam from lines 17 and 23 or tail gas from lines 19 and 24. The resulting reactant mixture is then passed from line 14 through line 32 directly to partial oxidation zone 18.

As illustrated in the figure, gas storage means 26 may be advantageously employed. In the embodiment instantly discussed, methane-oxygen from line 13 may be passed directly to gas storage 26 through lines 27 and 28. Supplementary reactant gas in line 14 may be passed directly to gas storage 26 through line 29. However, when supplementary steam from line 23 is utilized, it is preferable to pass it directly to zone 18. Gas from storage zone 26 may then be passed to zone 18 through lines 31 and 32. When adding steam from lines 23 and 14, it may be admixed with gas from line 31 in line 32, and the resulting admixture passed to partial oxidation zone 18. Gas storage means may be especially advantageously employed to facilitate proper mixing of the feed components entering zone 18.

In a second embodiment of my invention, steam may be utilized as the sole carrier gas. Steam thus employed is passed from lines 17 and 11 through zone 12 maintained under oxygen liberating conditions already described, and as a carrier, removes free oxygen from zone 12 in admixture with itself. Effluent from zone 12 comprises steam-oxygen and is passed through lines 13, 27 and 30, and cooler 33 to oxygen purification means 34 wherein steam is completely removed from the influent gases usually, by condensation means. However, it may be desirable to remove water from zone 34 influent gas by means of absorption or other means known in the art for separating free $H_2O$ from a gas mixture. Water thus removed, may be passed from zone 34 through line 36. Oxygen of high purity is passed from zone 34 through lines 37 and 38 to line 14 and therein admixed with methane from lines 10 and 21. The resulting methane-oxygen in line 14 is then passed to zone 18 through line 32. Oxygen gas storage means 41 may be utilized for maintaining oxygen flow from lines 37 and 38 to line 14 by closing valve 39 and passing gas from line 38 to storage 41 through line 42. Oxygen may then be returned as needed to line 38 through line 43.

Gas storage means 26 may be utilized in this second modification by passing oxygen thereto from line 38 through line 44 and by passing methane thereto from line 14 through line 29. Methane-oxygen from zone 26 is then passed through lines 31 and 32 to zone 18 wherein it is converted to synthesis gas. Here, as described in the first discussed embodiment, supplementary gases can be admixed with methane-oxygen in line 14 or in storage 26 in any desired proportion and combination, and the supplemented methane-oxygen mixture passed to partial oxidation zone 18.

Steam is preferably used as the sole carrier in the second described embodiment of my invention because of the ease with which it may be separated from the oxygen mixture. Carbon dioxide may similarly be utilized since its separation can be effected by well-known absorption means.

When practicing the second discussed embodiment, it may be desired to retain a portion of the steam in the steam-oxygen effluent from zone 12. This may be done by diverting a portion of the steam-oxygen effluent in line 13 to line 14 while passing the remaining portion to oxygen purification means 34. The portion of steam-oxygen in line 14 is then admixed with methane and oxygen in line 14 or in line 32 as the case may be.

Various advantages arise from the use of tail gas from a Fischer-Tropsch synthesis step, as a carrier. Such tail gas may often contain as high as 40 per cent hydrogen and from 1 to 4 per cent carbon monoxide with the remainder comprising methane and carbon dioxide; it may be used in a manner similar to that already described in the first discussed embodiment, i. e., tail gas from lines 19 and 11 is passed through zone 12 maintained under oxygen liberating conditions already described, and as a carrier, removes the liberated free oxygen from zone 12 in admixture with itself. Effluent tail gas-oxygen, from zone 12, is then admixed with methane and any other supplemental gas desired in line 14 by means already described, and passed through line 32 to partial oxidation zone 18. Gas storage means 26 may be utilized by means already described and illustrated, to facilitate the flow of feed gas thus produced to zone 18.

As has been illustrated in the foregoing discussion, carrier gas is not necessarily a hydrocarbon, but is necessarily capable of serving as a reactant in partial oxidation zone 18 to produce synthesis gas. My process employs as a carrier gas, any gas capable of serving as a reactant in partial oxidation zone 18 to form carbon monoxide and hydrogen and consisting of at least one of the group steam, carbon dioxide and hydrocarbon as a reactant component. These carriers may contain materials that are inert to any reaction in zone 18, such as natural gas which contains a small amount of an inert impurity such as nitrogen, and tail gas from a Fischer-Tropsch synthesis step, containing hydrogen and carbon monoxide.

Referring again to Figure I, reduced oxide in contact zone 12, i. e., metallic mercury, is passed through line 46 to regeneration zone 47 wherein it is reoxidized to mercury oxide. This is done by maintaining the mercury in zone 47 at a temperature preferably in the range of from 30° to 80° C., and contacting the thus heated mercury with oxygen-containing gas, preferably air, introduced to zone 47 through lines 48 and 49. Mercury oxide thus formed is removed from zone 47 by entrainment with effluent nitrogen-rich regeneration gas along with small amounts of mercury vapor, which is passed from zone 47 through line 51 to separation zone 52. Mercury oxide settles in separator 52 and is passed from zone 52 through line 50 to contacting zone 12. Vaporous mercury and nitrogen pass overhead through line 53, cooler 54 and line 56 to mercury accumulator 57, wherein metallic mercury originally present in zone 47 effluent, is separated from nitrogen and returned to zone 47 through line 61. Nitrogen is passed overhead from zone 57 through line 59 to further utilization, not shown.

In some instances, it may be desirable to supplement the regenerating gas in line 48 with oxygen from line 37 passed to line 48 through line 58.

Product formed in zone 18, comprising hydrogen, carbon monoxide, carbon dioxide and steam, is stripped of steam, by means not shown, to yield a synthesis feed stock containing carbon monoxide and hydrogen as the chief components in a desired hydrogen to carbon monoxide mole ratio, usually about 2:1. Synthesis gas product, from zone 18 is passed through line 62 to Fischer-Tropsch synthesis zone 63 wherein it is converted to hydrocarbons and oxygen derivatives of hydrocarbons in the presence of a promoted iron catalyst, preferably fluidized, at a space velocity of influent gases within the range of 1500 to 3500 standard volumes per volume of catalyst per hour (fluid operation) at a temperature within the range of 295 to 350° C., and at a pressure in the range of from 5 to 30 atmospheres. Total effluent from zone 63 is passed through line 64 to product separation means 66 which comprises coolers, separators, distillation equipment, storage tanks, and the like, not individually illustrated, which can be used to effect a separation of various selected product fractions. Tail gas, already described, is passed from zone 66 through line 19. Other selected fractions withdrawn from zone 66 are a normal gaseous hydrocarbon fraction through line 67, a gasoline fraction through line 68, a fraction containing oxygenated compounds through line 69, a gas-oil fraction through line 71, and a heavier wax and wax-like product fraction through line 72. By-product water is withdrawn through line 73.

My process is applicable to fluid bed, moving bed and fixed bed type operation. As illustrated in Figure I, an oxide bed in the fluid state can be maintained in contacting zone 12, dependent upon the influent gas space velocity and the particular mesh size of the selected oxide. A catalyst side stream can be passed to regeneration zone 47, reactivated therein and returned to contacting zone 12 through line 51, separator 52 and line 50. With further reference to Figure I, my process may utilize a moving oxide bed. For example, solid granular oxide can be moved downwardly through zone 12 and passed through line 46 to regeneration zone 47, reactivated therein and returned to contacting zone 12 by elevating means 55.

Operating my process with a fixed oxide bed is illustrated by reference to Figure II by which I have diagrammatically represented my process when employing a fixed lead oxide bed, wherein the operation is cyclic, i. e., at least one bed is being oxidized or regenerated while another bed, comprising either fresh or reactivated oxide imparts oxygen to a carrier gas. Referring then to Figure II, contacting zone 15 contains a fixed bed of granular lead oxide containing appreciable amounts of oxygen higher than PbO, maintained at a temperature in a preferred range of 280–525° C. Under such temperature conditions in zone 15, the oxide liberates free oxygen. Methane from lines 10 and 11 is passed through zone 15, as a carrier gas, and removes liberated free oxygen in admixture with itself. The rate of oxygen liberation in zone 15 is dependent upon the temperature level maintained therein and the concentration of oxygen in the effluent from the oxygen liberating zone 13 at a given temperature level is regulated by the influent rate of carrier gas. As already described with reference to Figure I, the oxygen-content of the effluent gas in line 13 is regulated by controlling these two variables. At the temperature level maintained in zone 15 a minor amount of methane carrier gas passing therethrough, may be oxidized, although such an amount is generally less than from 1 to 20 per cent. In such instances, any methane oxidation product in zone 15 is in no way harmful, since carbon dioxide-steam thus formed ultimately serves as a reactant in the subsequent partial oxidation in zone 18, already described, and any carbon monoxide and hydrogen formed in zone 15 as the result of methane oxidation, "rides" on through zone 18 and emerges in the synthesis gas product. My method is to be distinguished from those known in the art wherein a hydrocarbon is partially oxidized in substantial quantity in the presence of a metallic oxide, such as iron oxide, for the sole purpose of producing synthesis gas.

Methane-oxygen in line 13 may be utilized in exactly the same manner as already described, with reference to Figure I, i. e., it may be supplemented with gases in line 14, when desired, and converted to synthesis gas in zone 18. Similarly, steam may be utilized as the sole carrier gas whereby a steam oxygen effluent in line 13 may be utilized in exactly the same manner as that described with reference to Figure I.

When lead oxide in zone 15 is spent below a predetermined minimum level, the flow of methane carrier gas from line 10 is diverted from line 11 to line 11–a and passed through zone 15–a containing either fresh lead oxide or regenerated lead oxide from a previous oxygen-liberating cycle, maintained at oxygen liberating conditions. A methane-oxygen effluent is passed from zone 15–a through line 13–a and may be passed through line 14–a to line 14, wherein it is either admixed with supplementary gases in any manner previously described, or passed alone to zone 18 through line 32. Similarly, other carrier gases already discussed may be passed through zone 15–a and the resulting carrier-oxygen effluent utilized in any manner previously described and discussed with reference to Figure I.

Subsequent to diverting carrier gas from zone 15 to zone 15–a, the spent fixed lead oxide bed in zone 15, is reoxidized by contact with air at a temperature within the range of 100° to 350° C. This is done by passing air from lines 48, 49 and 11 through zone 15. Effluent from zone 15 is nitrogen-rich and is passed therefrom through lines 13, 27, 30 and 61, to further utilization not shown.

At the end of a predetermined cycle, methane carrier gas passing through zone 15-a is diverted from line 11-a to line 11 and the oxygen liberating cycle in zone 15, is repeated. Lead oxide in zone 15-a, spent to below a predetermined minimum during its oxygen-liberating cycle is then reoxidized by passing air from lines 48, 49 and 11-a through zone 15-a at the aforesaid regeneration temperature, whereby the spent oxide therein is regenerated. Effluent nitrogen-rich regeneration gas from zone 15-a is passed through lines 13-a, 30-a and 62 to disposal or further utilization, not shown.

The length of the operating cycles is preferably such that the lead oxide bed becomes only partially spent during the oxygen liberating cycle. When so operating, the oxide regeneration can be regulated to be complete within the time allotted for oxygen liberation in the oxide bed imparting oxygen to the carrier. In fixed bed operation the concentration of oxygen in the carrier-oxygen effluent obviously changes during the cycle, and in conjunction with this type operation, gas storage means such as storage 26 is advantageously employed as a means for providing a hydrocarbon-oxygen stock of a satisfactorily constant composition.

It is within the scope of this invention to employ an oxide admixed or incorporated with an inert filler material. The use of such an inert filler material may be especially helpful in some instances of fixed bed type operation.

When employing a hydrocarbon carrier with certain metal oxides which liberate oxygen at such high temperatures that an undesirably large proportion of the hydrocarbon carrier in contact with the oxide under oxygen liberating conditions may be oxidized, it may be preferable and advantageous to employ steam together with the hydrocarbon as the carrier, and in some such instances steam carrier alone may be advantageously employed.

For convenience and clarity certain apparatus, such as pumps, surge tanks, accumulators, valves, etc. have not been shown in the drawing. Obviously such modifications of the present invention may be practiced without departing from the scope of the invention.

As will be evident to those skilled in the art, various modifications of this invention can be made, or followed, in the light of the foregoing disclosure and discussion, without departing from the spirit or scope of the disclosure or from the scope of the claims.

I claim:

1. A process for the manufacture of a hydrocarbon-oxygen mixture suitable for burning to form synthesis gas to be charged to a process of the Fischer-Tropsch type, comprising passing a stream of the hydrocarbon component of said mixture to be burned, through a body of a metal oxide, said oxide hereinafter defined, at a temperature at which free oxygen is liberated from said oxide, in an amount of said hydrocarbon to provide a resulting admixture containing oxygen in a mol ratio to said hydrocarbon for producing synthesis gas as a result of said burning, said metallic oxide being capable of liberating free oxygen at a temperature at which not more than 30 per cent of said hydrocarbon is reacted when in contact therewith.

2. A method for the manufacture of synthesis gas to be charged to a process of the Fischer-Tropsch type, which comprises in a first step passing a hydrocarbon gas through a body of metal oxide, said oxide hereinafter defined, at a temperature at which free oxygen is liberated from said oxide and in a second step burning a resulting hydrocarbon-oxygen mixture from said first step, to produce said synthesis gas, said oxide liberating free oxygen at a temperature at which not more than 30 per cent of said hydrocarbon is reacted when in contact therewith, and recovering synthesis gas from said second step as a product of the process.

3. The process of claim 1 wherein said metallic oxide is lead oxide containing oxygen in an amount higher than PbO.

4. The method of claim 2 wherein said hydrocarbon gas is natural gas.

5. The method of claim 4 wherein said hydrocarbon gas is methane.

6. The method of claim 2 wherein said hydrocarbon is a portion of the amount of hydrocarbon required in said combustion step and hydrocarbon-oxygen effluent from the zone of said contacting is admixed with the remaining portion of said required amount of hydrocarbon.

7. The process of claim 2 wherein said metallic oxide is lead oxide containing oxygen in an amount higher than PbO.

8. A method for the manufacture of synthesis feed gas for a process of the Fischer-Tropsch type which comprises passing hydrocarbon gas through a body of metallic oxide, said metallic oxide contained in a contacting zone, said metallic oxide hereafter defined, at a temperature at which free oxygen is liberated from said oxide whereby a hydrocarbon-oxygen effluent is formed, said metallic oxide liberating oxygen at a temperature at which not more than 30 per cent of said hydrocarbon is reacted while in said contacting zone said metallic oxide becoming gradually spent of its ability to liberate oxygen, passing spent oxide from said contacting zone to a regeneration zone and therein reoxidizing the spent portion, recycling reactivated oxide to said contacting zone, passing hydrocarbon-oxygen effluent from said contacting zone to a partial oxidation zone and therein forming from said effluent by means of combustion a carbon monoxide-hydrogen mixture suitable for synthesis gas feed for a process of the Fischer-Tropsch type, and recovering said synthesis feed gas from the zone of said combustion.

9. A method for the manufacture of synthesis feed gas for a process of the Fischer-Tropsch type, which comprises passing a hydrocarbon gas through a first contacting zone containing a fixed bed of metallic oxide capable of liberating free oxygen at a temperature at which not more than 30 per cent of said hydrocarbon in said first zone is reacted when in contact with said oxide liberating oxygen, passing said hydrocarbon gas through said first contacting zone at a temperature at which free oxygen is liberated from said oxide whereby a hydrocarbon-oxygen mixture is formed and effluent from said first zone comprises said hydrocarbon-oxygen mixture, passing said first zone effluent to a combustion zone and therein burning same to form carbon monoxide-hydrogen product suitable for use as synthesis feed gas in a process of the Fischer-Tropsch type; said metallic oxide in said first zone becoming at least partially spent of its ability to liberate oxygen during said contacting, when said first zone oxide becomes at least partially spent passing said hydrocarbon gas through a second contacting zone containing a fixed bed of said metallic oxide maintained at said oxygen liberating temperature whereby a hydrocarbon-oxygen mixture is formed and comprises effluent from said second zone, passing said second zone effluent to a combustion zone and therein burning same to form a carbon monoxide-hydrogen product mixture suitable for use as synthesis feed gas in a process of the Fischer-Tropsch type, and passing an oxygen-containing gas through said first zone containing metallic oxide at least partially spent at a temperature at which said partially spent oxide is regenerated by oxidation.

10. The process of claim 8 wherein said hydrocarbon-oxygen effluent is admixed with supplemental gas serving as a reactant in said combustion step to form synthesis feed gas.

11. A process for the manufacture of a hydrogen-carbon monoxide stock suitable for feed to a synthesis step of a process of the Fischer-Tropsch type, wherein mercury oxide is the source of said free oxygen and wherein the mole ratio of hydrogen to carbon monoxide in the product stock is adjusted by supplementing said free oxygen with steam, said process comprising passing natural gas through a body of mercury oxide in a contacting zone maintained at a temperature within the range of 100–250° C. and at an influent rate to provide effluent containing oxygen to natural gas in a mole ratio within the range of 0.7:1 to 0.9:1, passing oxygen-natural gas effluent from said contacting zone and admixing same with steam, burning said oxygen-natural gas-steam admixture in a combustion zone at a temperature within the range of 2350 to 2500° F. to form carbon monoxide-hydrogen product containing hydrogen to carbon monoxide in a mole ratio higher than that obtained when said burning is effected in the absence of steam, said mercury oxide liberating oxygen being reduced to metallic mercury whereby mercury collects in said contacting zone, passing mercury from said contacting zone to a regeneration zone and therein contacting said mercury with an oxygen-containing gas at a temperature within the range of 30–80° C. whereby said mercury is regenerated to mercury oxide, passing mercury oxide from said regeneration zone to said contacting zone, and recovering carbon monoxide-hydrogen formed in said combustion zone as product of the process.

12. The process of claim 1 wherein said metallic oxide is mercury oxide.

13. The process of claim 9 wherein said metallic oxide is lead oxide containing oxygen in an amount higher than PbO, said oxygen liberating temperature is within the range of 280 to 525° C., and wherein the temperature of said regeneration is 100 to 350° C.

14. The process of preparing a gaseous mixture of oxygen and a hydrocarbon gas which comprises contacting a normally gaseous hydrocarbon with a solid consisting essentially of barium peroxide at a temperature at which free oxygen is liberated from said oxide, but below the ignition temperature of said mixture and at substantially atmospheric pressure.

15. The process of preparing a gaseous mixture of oxygen and a hydrocarbon gas which comprises contacting a normally gaseous hydrocarbon with a solid consisting essentially of barium peroxide at a temperature at which free oxygen is liberated from said oxide, but below the ignition temperature of said mixture and at substantially atmospheric pressure, and thereafter regenerating the spent barium peroxide by contacting it with air at substantially the same temperature and pressure.

16. The process of claim 8 wherein said oxide is mercury oxide.

References Cited in the file of this patent

UNITED STATES PATENTS

| | | |
|---|---|---|
| 945,048 | Ridley | Jan. 4, 1910 |
| 2,324,172 | Parkhurst | July 13, 1943 |
| 2,347,682 | Gunness | May 2, 1944 |
| 2,490,986 | Symonds | Dec. 13, 1949 |

OTHER REFERENCES

Mellor, "Comprehensive Treatise on Inorganic and Theoretical Chemistry," vol. I, page 349. (Copy in Scientific Library.)